No. 805,758. PATENTED NOV. 28, 1905.
H. J. SILVA & J. VASSALLO.
GROCER'S COMPUTING SCALE.
APPLICATION FILED MAY 6, 1903.

Witnesses
H. M. Wilson
J. J. Mawhinney

Inventors:
Henry J. Silva and
James Vassallo.

by J. B. Webster, Attorney

UNITED STATES PATENT OFFICE.

HENRY J. SILVA AND JAMES VASSALLO, OF STOCKTON, CALIFORNIA.

GROCER'S COMPUTING-SCALE.

No. 805,758.  Specification of Letters Patent.  Patented Nov. 28, 1905.

Application filed May 6, 1903. Serial No. 155,903.

*To all whom it may concern:*

Be it known that we, HENRY J. SILVA and JAMES VASSALLO, citizens of the United States, residing at Stockton, in the county of San Joaquin, State of California, have invented a new and useful Grocer's Computing-Scale, of which the following is a specification.

Our invention relates to certain improvements in grocer's scales adapted particularly for the purpose of retailing cheese, and has for its principal object to construct a machine which will accurately designate the price of such quantity as is desired by the customer.

A further object of the invention is to provide an improved method of pointing out the respective rows of numerals to be employed for determining the price.

With these purposes in view our invention consists in the following construction and combination of parts, the details of which will be fully described and the features of novelty then set forth in the claims.

Figure 1:
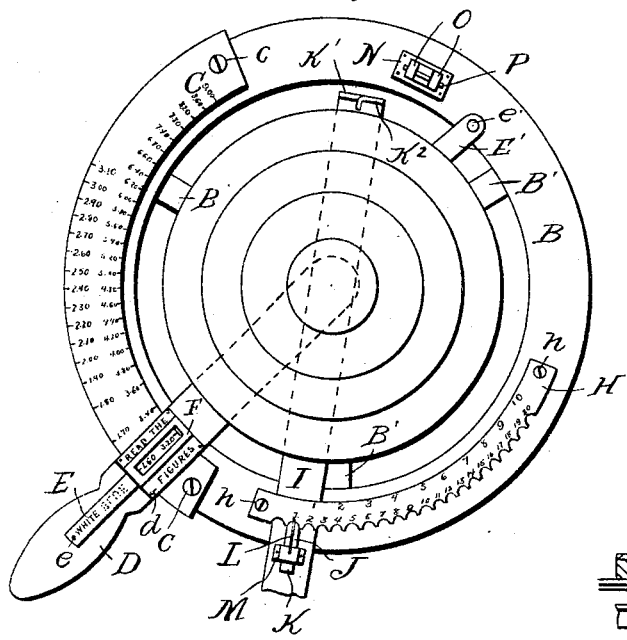
Figure 4:
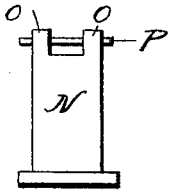
Figure 3:
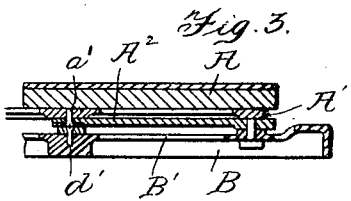
Figure 5:
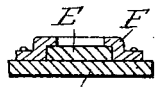
Figure 2:
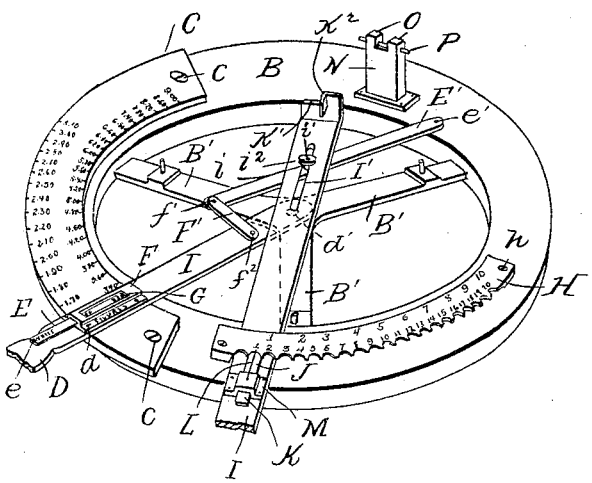

Figure 1 represents a plan view of a cheese-scale, less the knife, and showing our computing-plates, &c., with designating-numerals thereon. Fig. 2 is a perspective view of the base with the cheese-supporting plate removed. Fig. 3 is a vertical sectional view on the line $x\ x$ of Fig. 1. Fig. 4 is a detached view of the cutting-knife standard. Fig. 5 is a transverse sectional view of the handle D of Fig. 1, taken through the center of the chamber F.

Similar letters of reference are employed to indicate corresponding parts in the various figures of the drawings.

A designates a revolving circular platform provided with a series of concentric circles upon which the cheese to be disposed of may rest. This platform may rotate, preferably, upon a center hub $a$ beneath it.

B is a flat base-ring surrounding the platform A, slightly depressed.

C is a computing-plate showing the price of an entire cheese and is attached to the base-ring B by screws $c$. Upon this plate are two rows of prices, the outer commencing at "$1.60" and, increasing ten cents at a time, ending with "$3.10" and the inner commencing at "$3.20" and, increasing twenty cents at a time, until the sum of "$6.00" is reached, and from "$6.00" different sums until the sum of "$9.00" is reached. Such prices are arranged at suitable distances apart in harmony with a working mechanism beneath the platform A. A sliding handle D is attached to the mechanism above mentioned beneath the platform A and extends outwardly therefrom, over, and in contact with the plate C and when set in position is secured to the plate by the thumb-screw $d$, embracing when in position the desired price on the plate C, and at such point is provided with a chamber F, open at both ends, and is provided, as also is the handle D, with a slot G, permitting the operator to read the figures immediately beneath. In the chamber F a small plate E, provided with a lug $e$ on its surface to properly position it in the chamber, may be inserted, covering the figures beneath. On one side of plate E is the word "White" and on the reverse side the word "Blue."

Upon the handle D at the head of the chamber F are the words "Read the" and at the foot the word "Figures."

The numerals on the plate C respectively indicate the selling price of an entire cheese according to its weight and value per pound. The front row we indicate by a blue color and the rear row by a white color.

Provision is made for a retailing selling-price gage consisting of a plate H, attached by screws $h$ to the ring B, so as to leave a space between the ring B and the plate H. It is supplied with a row of notches on the outside edge, and immediately back of each notch, except the front notch, which is left blank, is a numeral commencing with the numeral "1" and ending with the numeral "20." An additional row of numerals is located in the rear of the first row, the numeral "4" of the front row in a line with the numeral "2" of the rear row and in such consecutive order, ending with the numeral "20" of the front row being in a line with the numeral "10" of the rear row.

The numerals in the rear row of the plate H indicate the price in cents at which a certain sector of cheese will be sold based upon the price of the entire cheese, as will appear by the selected numeral on the front row of numerals on the plate C. Likewise the front row of numerals of the plates H indicates the price in cents at which a certain sector of cheese will be sold based upon the cost of the entire cheese, as will appear by the selected numeral on the rear row of numerals on the plate C.

For the purpose of designation, as will be hereinafter shown, the front row of numerals on the plate H will be of a white color and the rear row of a blue color.

A sliding handle I is attached to a suitable mechanism connected to and beneath the platform A and extends outwardly therefrom under and in contact with the plate H and over and in contact with the base-ring B. A guide M, having a plunger J, provided with a handle K, is attached to the face of the handle I. Upon the top of the guide M is attached a finger or pointer L for the purpose, as will be shown.

A standard N is attached at its foot to the ring B and is provided with a forked end O O, carrying a pin P for the purpose, as will be shown.

The plate A is mounted upon a spider A′, the table being attached to said spider in any appropriate manner, and the spider A′ rotates upon a fixed plate A², that is supported by the three pins which project upwardly from the arms B′ of the base B, the spider A′ being pivotally secured to the plate A² by a central pin $a'$. The arms B′ of the base B are united at the center of the base, and a handle D is pivoted at $d'$ to the center of the spider formed by the arms B′. A lever E′ is pivoted to the base-ring E at $e'$ and is connected to the handle D by a link F′, which is pivoted at $f'$ to the lever E′ and at $f^2$ to the handle D. The handle I is formed with a longitudinal slot I′, and a pin $i'$, projecting from the lever E′, passes through the slot I, and a nut $i^2$ on top of the pin serves to maintain the lever and handle in proper relative position, while permitting them to slide or turn one in relation to the other, the pin $i'$ constituting a movable fulcrum for the handle I. The end of handle I is upturned at $k'$, and the upturned end is formed with a tooth $k^2$, which engages the edge of plate A when the handle is turned in one direction.

In practice the cheese is first weighed and, for illustration, may weigh sixteen pounds and is to be sold at the rate of twenty cents per pound or a gross sum of three dollars and twenty cents. The handle D is then set by aid of the slot G over the prices "$1.60" and "$3.20." The plate E by means of the lug $e$ is pushed into the chamber F, so that the words we have above described will read in an orderly manner "Read the white figures," and the prices "$1.60" and "$3.20" will be out of sight, intending thereby to instruct the operator to use the numerals of the front row of the plate H. The handle I is then placed in position so that the plunger J may enter the blank notch. Any desired style of a cheese-cutting knife may be attached by a properly-constructed handle to the standard N by the pin P at the forks O O, rendering the machine ready for active use. The knife above described is then depressed, and makes the first cut into the cheese from its center and is then elevated, and the desired sector of cheese obtained by pulling back the plunger J from the blank notch and by means of the handle I rotating the platform A until the finger or pointer L is opposite the notch showing the white numeral desired—say, for instance, "1"—which implies one cent's worth of cheese. The plunger J is then inserted in the notch and the knife depressed for the cutting operation, which will produce the desired sector of cheese.

It will be observed that the plate A is revolved in one direction by the movement of the handle I through the engagement of the teeth $k^2$ with the edge of the plate and that the movement of the handle D changes the position of the fulcrum $i'$ of the handle I accordingly as handle D is moved in one direction or the other, whereby a proportionately greater or less movement of the plate is effected by the movement of handle I.

If the weight and price of the cheese to be retailed should require the use of any of the front row of prices on the plate C, the plate E is reversed so that the instruction to the operator will read "Read the blue figures," which indicates that the rear or blue row of numerals are to be used in the same manner as we have described in the use of the white numerals.

From the foregoing description it will be observed that the function of the handle D and its attached parts is to fix the fulcrum of the handle I at such position as that the sector cut from the cheese will be of a size and a weight dependent upon the position at which the handle D is set when the cheese is first placed upon the table. Of course the size of each sector which is cut from the cheese will depend upon the point at which the handle I is held by the plunger J; but the size and consequent weight of each sector will be dependent upon the point at which the handle D is set, the setting of the handle D fixing the fulcrum I² of the handle I closer to or farther from the tooth $k^2$. The figures on the scale C therefore really indicate the point at which the fulcrum of lever I is fixed, and accordingly the position of the handle D will determine the appropriate size of each sector of cheese which will be cut when the handle I is moved, so as to cause the plunger J to engage with any of the notches in the edge of the plate H. If, for instance, the handle D is set at the number "200" on the scale C, each sector of cheese which is cut off from the cheese by turning the latter through the medium of the handle I will be of the appropriate size for so many cents' worth of cheese as it is intended should be cut by the position of the plunger J upon the scale H.

The concentric circles on the table A aid in striking a true center of cheeses of different weights.

No claim is made by us for the mechanism beneath the table or the form of the cutting-knife, as they and each of them may be of any suitable pattern and construction, and while the arrangement of parts herein described and illustrated by us we preferably use, yet it is apparent that there may be many changes in the form, size, and details of construction without relinquishing any of the advantages of our invention.

We are aware that placing money values upon a bar or plate is not new. Hence that feature we do not broadly claim.

Having thus described our invention, what we claim as new, and desire to secure by Letters Patent, is—

1. In a cheese-cutter, the combination of a revolving platform A, the base B on which said platform is mounted and having a ring surrounding said platform, a plurality of differently-colored scales on said ring, indicating total cheese values, a lever D swinging adjacent to said scales, a plurality of differently-colored scales on said ring indicating values of pieces of cheese to be cut off corresponding to each of the first-mentioned scales, the lever I swinging adjacent to the latter scales and mechanism controlled by said levers D and I for turning said platform A so that pieces of cheese of various predetermined values may be cut off from cheeses of different total values.

2. In a cheese-cutter, the combination of the revolving platform A, the base B on which said platform is mounted, said base having a ring extending beyond the edge of said platform, a plurality of differently-colored scales on said ring indicating total cheese values, a lever D swinging adjacent to said scales, a slotted chamber F carried by said lever, a color designating plate E entering said chamber, a plurality of differently-colored scales on said ring indicating values of pieces of cheese to be cut off corresponding to each of the first-mentioned scales, the lever I swinging adjacent to the latter scales, and mechanism controlled by said levers D and I for turning the said platform A so that pieces of cheese of various predetermined values may be cut off from cheeses of different total values.

3. In a cheese-cutter, the combination of the revolving platform A, the base B on which said platform is mounted, and having a ring surrounding the said platform, a plurality of differently-colored scales on said ring indicating total cheese values, a lever D swinging adjacent to said scales, a plurality of differently-colored scales on a notched plate mounted on said ring, indicating values of pieces of cheese to be cut off corresponding to each of the first-mentioned scales, the lever I swinging adjacent to said notched plate, the guide M attached to the lever I, the plunger J sliding in said guide M and adapted to engage with the notches on the said notched plate, and mechanism controlled by said levers D and I for turning said platform A so that pieces of cheese of various predetermined values may be cut off from cheeses of different total values.

In testimony whereof we affix our signatures in presence of two witnesses.

HENRY J. SILVA.
JAMES VASSALLO.

Witnesses:
JOSHUA B. WEBSTER,
STELLA ANDERSON.